United States Patent
Yang et al.

(10) Patent No.: US 9,519,952 B2
(45) Date of Patent: Dec. 13, 2016

(54) IMAGE PROCESSING APPARATUS AND METHOD

(71) Applicant: Realtek Semiconductor Corporation, Hsinchu (TW)

(72) Inventors: Jun-Yu Yang, Changhua County (TW); Chun-Hsing Hsieh, Hsinchu (TW); Shang-Yen Lin, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/993,067

(22) Filed: Jan. 11, 2016

(65) Prior Publication Data

US 2016/0267628 A1 Sep. 15, 2016

(30) Foreign Application Priority Data

Mar. 12, 2015 (TW) .............................. 104107955 A

(51) Int. Cl.
G06T 3/40 (2006.01)
G06T 11/60 (2006.01)
G06T 5/20 (2006.01)

(52) U.S. Cl.
CPC .............. *G06T 3/4007* (2013.01); *G06T 5/20* (2013.01); *G06T 11/60* (2013.01)

(58) Field of Classification Search
CPC ...... G06T 3/4038; G06T 11/60; G06T 15/205; G06T 7/0051; G06T 7/0065; G06T 7/0077; G06T 7/0075; G06T 5/005; G06T 2207/10028; G06T 2207/10024; H04N 1/3876; H04N 5/23238; G06K 2009/2045
See application file for complete search history.

(56) References Cited

U.S. PATENT DOCUMENTS 8,396,330 B2   3/2013  Pan et al.

FOREIGN PATENT DOCUMENTS

| TW | 200608797 A | 3/2006 |
| TW | 201503055 A | 1/2015 |
| WO | 2014/065160 A1 | 5/2014 |

OTHER PUBLICATIONS

Hongbin Sun et al., "An Edge-based Adaptive Image Interpolation and Its VLSI Architecture," IEEE, Dec. 3-6, 2012.
Yen-Tai Lai et al., "Adaptive Image Scaling Based on Local Edge Directions," IEEE, Jun. 15-17, 2010.
Kin Li et al., "New Edge-Directed Interpolation," IEEE, vol. 10, No. 10, Oct. 2001.

*Primary Examiner* — Duy M Dang
(74) *Attorney, Agent, or Firm* — CKC & Partners Co., Ltd.

(57) ABSTRACT

An image processing apparatus includes a gradient calculation unit, a direction determining unit, a directional interpolation unit, and a blender unit. The gradient calculation unit processes an input image to generate gradient magnitudes and gradient angles associated with input pixels of the input image. The direction determining unit generates interpolation angles and directional confidence values according to the gradient magnitudes and gradient angles. The directional interpolation unit performs directional interpolation on the input image according to the interpolation angles, so as to generate a first image with an image resolution different from the input image. The blender receives the first image and a second image generated from interpolating the input image, and blends the first image and the second image according to the directional confidence values to generate an output image.

11 Claims, 5 Drawing Sheets

IMAGE PROCESSING APPARATUS AND METHOD

RELATED APPLICATIONS

This application claims priority to Taiwan Application Serial Number 104107955, filed on Mar. 12, 2015, which is herein incorporated by reference.

BACKGROUND

Field of Disclosure

The disclosure relates to an image processing apparatus and method, and more particularly, to an image processing apparatus and method related to interpolation technology.

Description of Related Art

Due to the limitations encountered with respect to transmission speed or storage space, low-resolution images are often adopted. In order to display those low-resolution images on a display device with high resolution specification, the problem of different resolutions between images and the display device needs to be resolved.

Image resolution can be improved by using conventional image interpolation technology including non-directional nearest neighbor interpolation, bilinear interpolation and bicubic interpolation techniques. The conventional interpolation technology is often used because of low hardware cost and computing resource requirement. However, with the use of the conventional interpolation technology, a sawtooth appearance or blurring easily occurs at the edges of the image after interpolation.

On the other hand, there is an advanced interpolation process for interpolating image pixels according to covariance, such as generating image interpolation results according to relationship between the covariances of images with low resolution and high resolution. However, high hardware and computing costs are raised by such technology, which makes real-time image processing difficult to realize.

DETAILED DESCRIPTION

Figure 1:
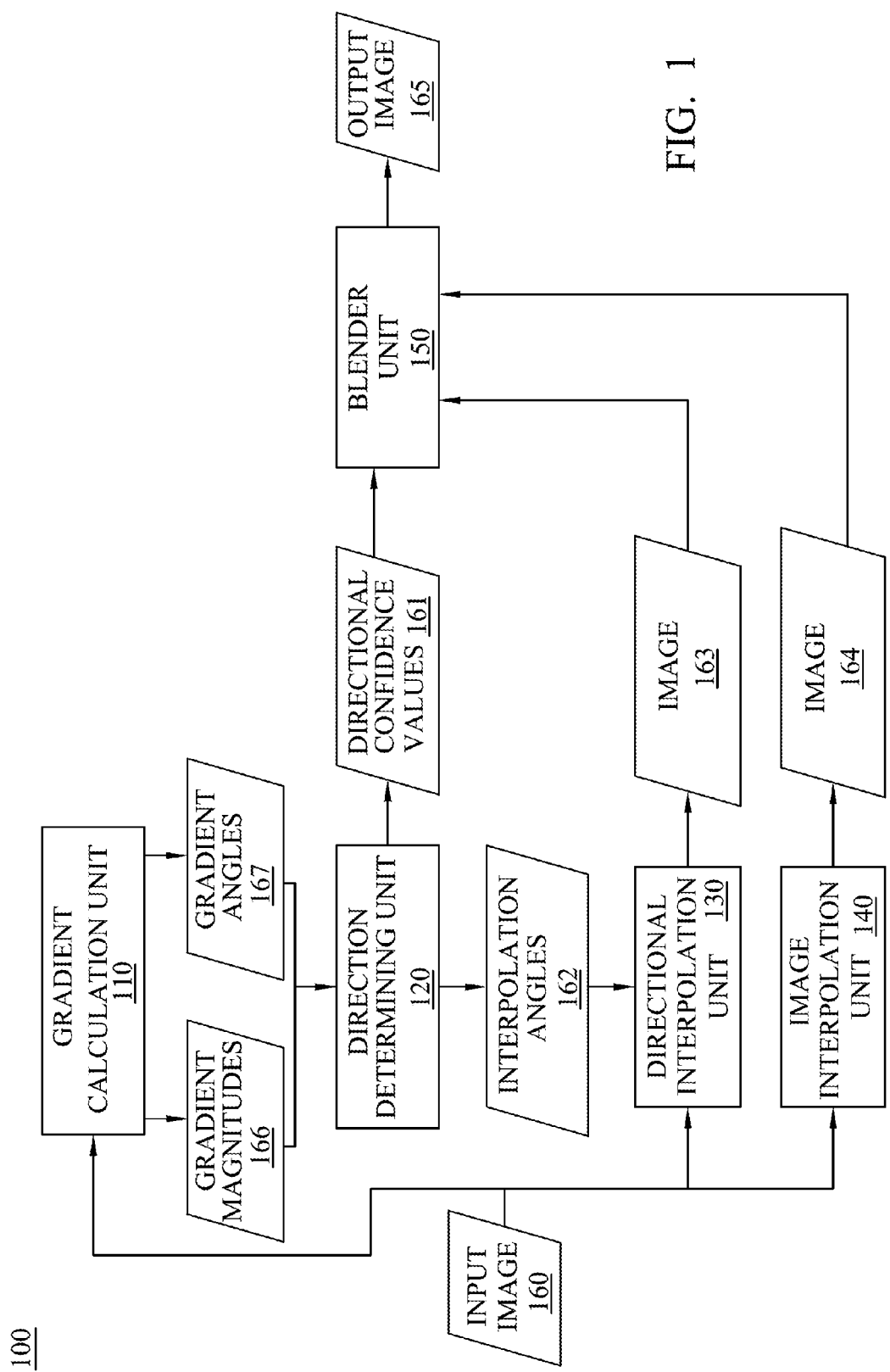
FIG. 1 illustrates a block diagram of an image processing apparatus according to some embodiments of the disclosure.

FIG. 1 illustrates a block diagram of an image processing apparatus 100 according to some embodiments of the disclosure. The parallelogram blocks represent output or input data, and the rectangular blocks represent hardware components. The image processing apparatus 100 receives an input image 160, and outputs an output image 165 with a resolution different from that of the input image 160. For example, the image processing apparatus 100 receives the input image 160 with a resolution of 5×5 pixels, and outputs the output image 165 with a resolution of 10×10 pixels.

The image processing apparatus 100 includes a gradient calculation unit 110, a direction determining unit 120, a directional interpolation unit 130, an image interpolation unit 140 and a blender unit 150. The gradient calculation unit 110 performs an operation on the input image 160 to generate gradient magnitudes 166 and gradient angles 167 associated with input pixels of the input image 160. The direction determining unit 120 generates directional confidence values 161 and interpolation angles 162 according to the gradient magnitudes 166 and the gradient angles 167 associated with the input pixels. The interpolation angles 162 are related to edge directions of the image, while the directional confidence values 161 represent the likelihood that the interpolation angles 162 are the correct edge directions. The edge directions are normal directions of the edges. The directional interpolation unit 130 performs directional interpolation on the input image 160 according to the interpolation angles 162, and generates an image 163 with a resolution different from that of the input image 160. The image interpolation unit 140 performs interpolation on the input image 160 to generate an image 164. The blender unit 150 blends the images 163 and 164 into the output image 165 according to the directional confidence values 161. The result of the directional confidence values 161 combined with directional interpolation and image interpolation can improve the quality (e.g., sharpness) of the output image 165.

In various embodiments, each of the gradient calculation unit 110, the direction determining unit 120, the directional interpolation unit 130, the image interpolation unit 140 and the blender unit 150 may be implemented by an application specific integrated circuit (ASIC) or a field programmable gate array (FPGA). Alternatively, the image processing apparatus 100 may be integrated into a system on chip (SoC), in which the elements 110-150 are functional blocks of the chip. Further, in some embodiments, the image processing apparatus 100 may be a personal computer (PC) or microcontroller, and the elements 110-150 may be functional modules implemented by software or firmware and stored in the storage device of the image processing apparatus 100, and executed by a central processor or another processor of the image processing apparatus 100.

The image processing apparatus 100 adds pixels in the output image 165 whose resolution is higher than that of the input image 160. The pixel values associated with the added pixels make edges in the output image 165 smooth and continuous, and reduce sawtooth or blurred edges caused by traditional image interpolation technology. In color images, pixel values can be classified into pixel values of red, green and blue colors, or strength values of color hue, color saturation and brightness. To facilitate the description to follow, gray level strength value is used as an example of the pixel value to describe details associated with the operations of the image processing apparatus 100.

The gradient calculation unit 110 performs an operation on the input image 160 to generate gradient magnitudes 166 and gradient angles 167 respectively associated with input pixels of the input image 160. A greater gradient magnitude represents a greater difference between pixel values of a pixel and the neighboring pixels, that is, the pixel is more possibly associated with the boundary area in the image, while the gradient direction is associated with the boundary direction in the image. In one embodiment, the gradient calculation unit 110 performs a convolution of Sobel operators in vertical and horizontal directions, and the input image 160 uses the average absolute value of the result in the vertical direction Dy and the result in the horizontal direction Dx as the gradient magnitude. The gradient calculation unit 110 also divides the result in the vertical direction Dy by the result in the horizontal direction Dx and then performs an arctangent operation thereon to obtain the gradient angle. The formulas to perform these calculations are as follows:

$$\text{GradientMagnitude} = (|Dx| + |Dy|)/2, \text{ and}$$

$$\text{GradientAngle} = \arctan(Dy/Dx).$$

In another embodiment, the gradient calculation unit 110 uses the root-mean-square (RMS) value of the result in the vertical direction Dy and the result in the horizontal direction Dx as the gradient magnitude.

In another embodiment, the gradient calculation unit 110 uses a Prewitt operator to perform a convolution operation with the input image 160, so as to obtain the gradient magnitudes 166 and the gradient angles 167. In a further embodiment, the gradient calculation unit 110 performs filtering on the gradient magnitudes 166 and the gradient angles 167 associated with the input pixels according to a gradient threshold value, i.e., the parts of the gradient magnitudes 166 less than the gradient threshold value are taken as 0, so as to avoid interpreting changes of the pixel values due to noise interference in the digital image as an edge. For example, the gradient threshold value may be one-eighth or one-sixteenth of the greatest of the pixel values.

The direction determining unit 120 generates the interpolation angles 162 and directional confidence values 161 according to the gradient magnitudes 166 and gradient angles 167. The interpolation angles 162 represent the edge directions, while the directional confidence values 161 represent the likelihood that the edge directions of the interpolation angles 162 are correct. As described above, the input pixels of the edge portions in the input image 160 are associated with higher gradient magnitudes. However, because noise is included in the digital images, directly using the gradient magnitudes and the gradient directions to determine the edge portions and the edge directions of the input image 160 may result in an incorrect determination. Therefore, the direction determining unit 120 uses multiple pieces of gradient information of the input pixels to obtain reliable interpolation angles 162, rather than relying on the gradient magnitude and the gradient direction of single input pixel to generate the interpolation angles 162 and the directional confidence values 161.

Figure 2A:
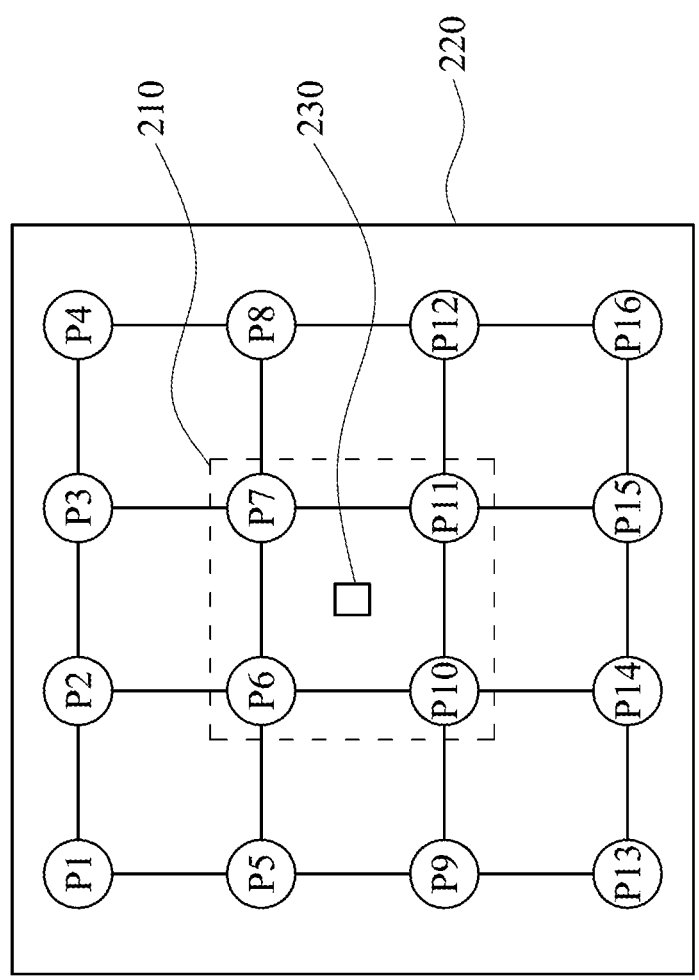
FIG. 2A illustrates a schematic diagram of a pixel range according to some embodiments of the disclosure.

In one embodiment, the input pixels include multiple first input pixels in the first range. As shown in FIG. 2A, the input pixels P6, P7, P10 and P11 included in the range 210 are the first input pixels, and the direction determining unit 120 compares the gradient magnitudes 166 and the gradient angles 167 of the first input pixels and the input pixels (the input pixels P1-P5, P8-P9 and P12-P16) adjacent to the first image pixels to generate the first interpolation angle of the interpolation angles 162 and a first directional confidence value of the directional confidence values 161. The generated first interpolation angle and the first directional confidence value are associated with a central pixel 230, and the image 163 includes the central pixel 230. Specifically, the direction determining unit 120 calculates the gradient angle difference between the first input pixels (the input pixels P6, P7, P10 and P11) and the input pixels adjacent thereto so as to determine one of the first input pixels whose gradient angle is nearest to the gradient angles of the adjacent input pixels, and generates the first interpolation angle and the first directional confidence value by the corresponding gradient angle and the gradient magnitude.

Figure 2B:
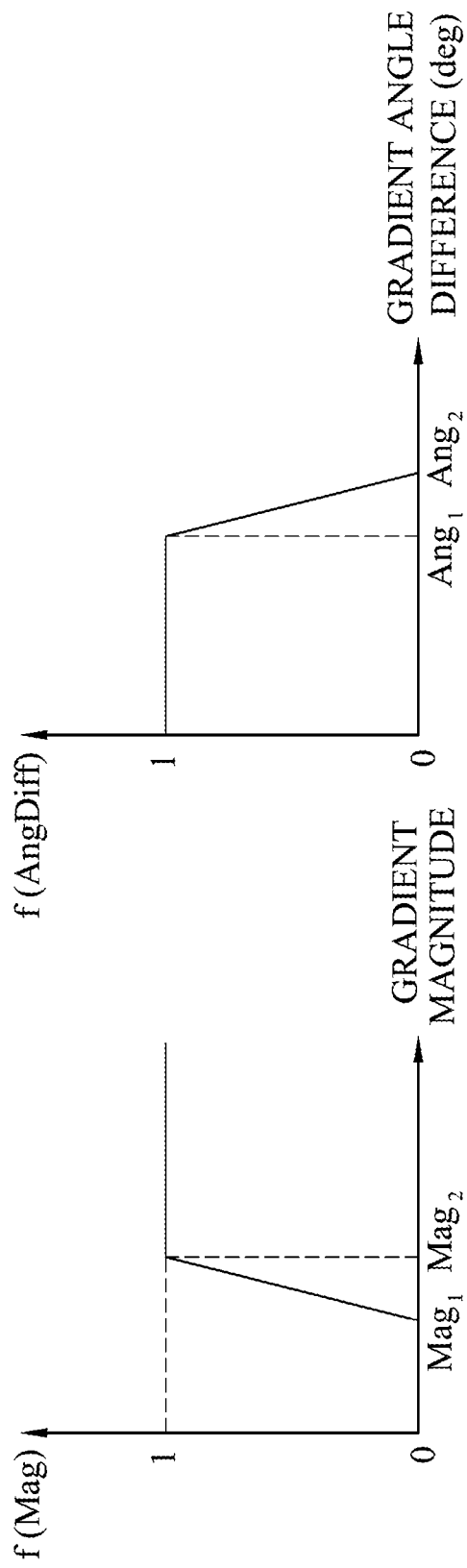
FIG. 2B illustrates a comparison table of direction determination according to some embodiments of the disclosure.

In one embodiment, the direction determining unit 120 calculates the gradient angle difference between each one of the first input pixels (the input pixels P6, P7, P10 and P11) and the input pixels P1-P16. The direction determining unit 120 then uses the gradient magnitudes as weighting factors to calculate the confidence values of first input pixels, uses the gradient angle with the highest confidence value as the first interpolation angle, and further uses the confidence value with the highest confidence value as the first directional confidence value. The confidence value Confidence$_k$ of the input pixel Pk among the first input pixels is obtained from the following formula:

$$\text{Confidence}_k = Z_{i=1\text{-}16} f(\text{Mag}_i) \cdot f(\text{AngDiff}_{i,k}), k=6,7,10,11,$$

where Mag$_i$ is the gradient magnitude of the input pixel Pi, Ang$_i$ is the gradient angle of the input pixel Pi, AngDiff$_{i,k}$ is the gradient angle difference between the input pixel Pi and the input pixel Pk, and the gradient magnitude output function f(Mag$_i$) and the gradient angle difference output function f(AngDiff$_{i,k}$) are shown in FIG. 2B.

The gradient magnitude output function f(Mag$_i$) includes the threshold value Mag$_1$ and the threshold value Mag$_2$. When the gradient magnitude of the input pixel Pi is less than that of the threshold value Mag$_1$, the direction determining unit 120 determines that the input pixel Pi is not associated with the edge of the image, and f(Mag$_i$) is 0. When the gradient magnitude of the input pixel Pi is greater than that of the threshold value Mag$_2$, the direction determining unit 120 determines that the input pixel Pi corresponds to the edge of the image, and f(Mag$_i$) is 1. When the gradient magnitude of the input pixel Pi is between the threshold values Mag$_1$ and Mag$_2$, the direction determining unit 120 determines that the input pixel Pi possibly corresponds to the edge of the image, and f(Mag$_i$) is between 0 and 1. The gradient angle difference output function f(AngDiff$_{i,k}$) includes the threshold values Ang$_1$ and Ang$_2$. When the absolute value of the gradient angle difference between the input pixel Pi and the input pixel Pk is less than the threshold value Ang$_1$, the gradient angles of the input pixel Pi and the input pixel Pk are deemed as being in the same direction, and f(AngDiff$_{i,k}$) is 1. When the absolute value of the gradient angle difference between the input pixel Pi and the input pixel Pk is greater than the threshold value Ang$_2$, the gradient angles of the input pixel Pi and the input pixel Pk are deemed as being in different directions, and f(AngDiff$_{i,k}$) is 0. When the absolute value of the gradient angle difference between the input pixel Pi and the input pixel Pk is between the threshold values Ang$_1$ and Ang$_2$, the gradient angles of the input pixel Pi and the input pixel Pk are deemed as being in similar directions, and the output value of the gradient angle difference output function f(AngDiff$_{i,k}$) is between 0 and 1. The confidence value Confidence$_k$ of the input pixel Pk calculated from the abovementioned formula represents the possibility that the imaging range of the input pixels P1-P16 includes the edge directions.

In one embodiment, the range of the gradient magnitude of the image is 0-255, and the threshold values Mag$_1$ and Mag$_2$ of the gradient magnitude output function f(Mag$_i$) are 40 and 100 respectively. Moreover, the range of the gradient angle of the image is 0°-180°. Because of the periodic characteristic of the gradient angle, the range of the gradient angle difference is 0°-90°. The threshold values Ang$_1$ and Ang$_2$ of the gradient angle difference output function f(AngDiff$_{i,k}$) are 15° and 30° respectively.

In another embodiment, the input pixels also include multiple second input pixels in the range 220, and the range 220 includes the range 210. The direction determining unit 120 compares the first interpolation angle and the gradient angles of the second input pixels to update the first interpolation angle. Specifically, the direction determining unit 120 accumulates the horizontal direction gradient magnitude Dx and the vertical direction gradient magnitude Dy of the second input pixel among the second input pixels (the input pixels P1-P16) respectively, of which the difference between the associated gradient angle and the first interpolation angle is less than an angular threshold value. The direction determining unit 120 then performs a division operation and an arctangent operation on the accumulated results to obtain a result for updating the first interpolation angle. In some embodiments, the angular threshold value is 10°. In other embodiments, the angular threshold value is 15°.

Hence, the direction determining unit 120 tunes the first interpolation angle obtained according to the input pixels in the range 210 by the gradient information of the input pixels in the larger range 220, such that the obtained first interpolation angle conforms more closely to the gradient direction of the neighboring areas, which further reduces the noise and generate the image 163 with more stable and smoother edges.

The directional interpolation unit 130 performs directional interpolation on the input image 160 according to the interpolation angles 162 generated by the direction determining unit 120, so as to generate the image 163. The resolution of the image 163 is different from that of the input image 160, but is the same as that of the output image 165. The interpolation angles 162 are associated with the edge direction of the input image 160, and the directional interpolation unit 130 performs directional interpolation according to the interpolation angles 162, such that the image 163 with interpolated pixels is sharper and clearer than an image manipulated by the conventional image interpolation technology.

Figure 3A:
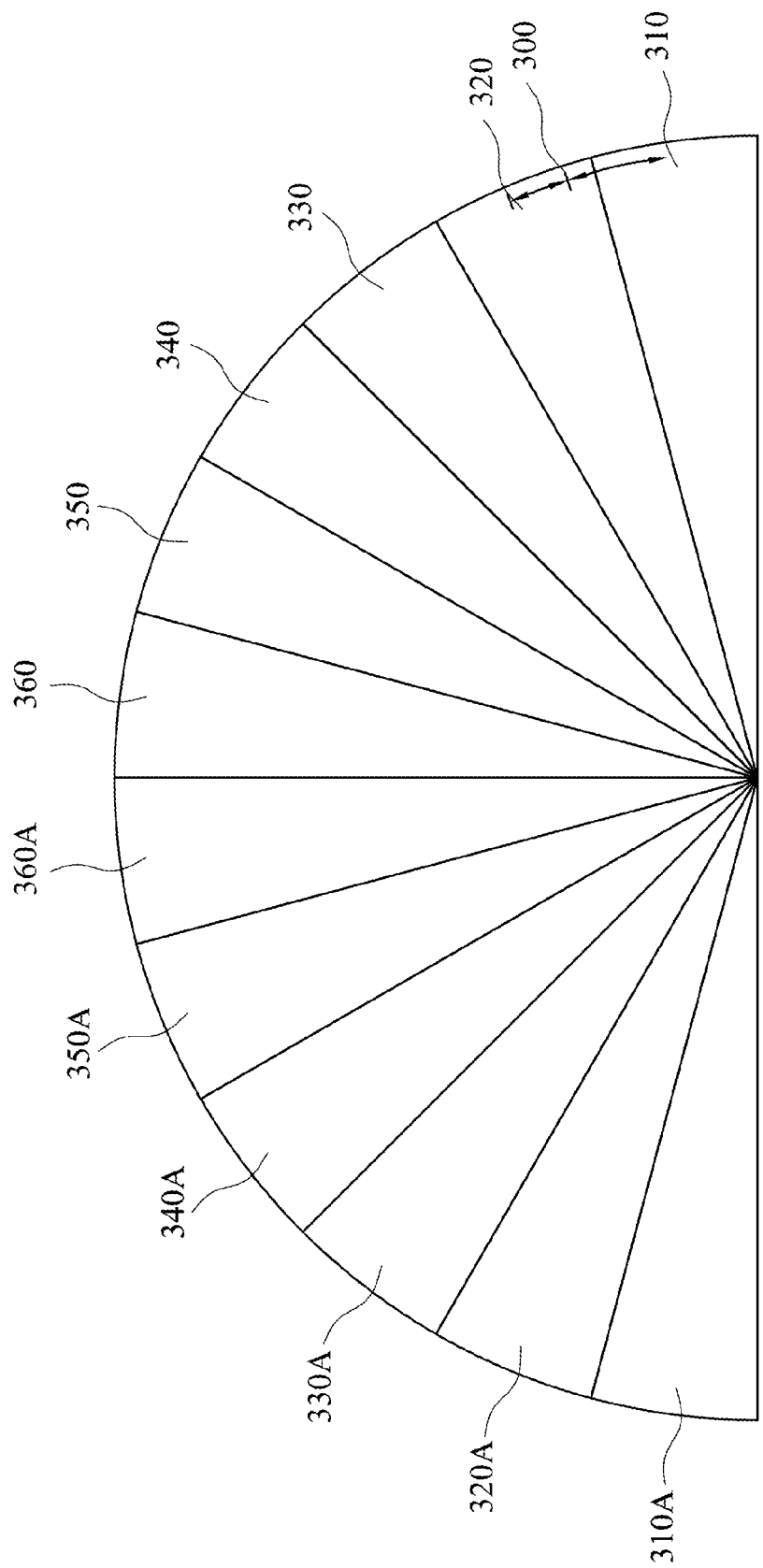
FIGS. 3A and 3B illustrate schematic diagrams of angular intervals and angular sampling windows according to some embodiments of the disclosure.

In one embodiment shown in FIG. 3A, the directional interpolation unit 130 associates the interpolation angle 300 generated by the direction determining unit 120 with the angular interval 320 among the angular intervals 310-360. The interpolation angle 300 is one of the interpolation angles 162 generated by the direction determining unit 120. The angular intervals 310-360 cover 90 degrees, and each of the angular intervals 310-360 is 15°. The direction determining unit 120 selects the input pixels within a sampling window as multiple directional interpolation input pixels, and selectively performs low-pass filtering on the directional interpolation input pixels according to the angular interval 320. The direction determining unit 120 then generates a pixel value of a first pixel according to pixel values of the processed directional interpolation input pixels, where the first pixel is one of the pixels in the image 163 and is associated with the interpolation angle 300.

The low-pass filtering performed by the directional interpolation unit 130 includes horizontal low-pass filtering and vertical low-pass filtering. The directional interpolation unit 130 performs low-pass filtering on the directional interpolation input pixels in the sampling window, such that the processed result is closer to the interpolation angle 300. In the embodiment, the size of the sampling window selected by the directional interpolation unit 130 is 4×4 pixels, and the directional interpolation unit 130 performs horizontal low-pass filtering on the directional interpolation input pixels in the central 2×2 or 4×4 pixel range in the sampling window according to the angular interval 320.

In some embodiment, when the interpolation angles 162 corresponds to the angular interval 310, the directional interpolation unit 130 also performs horizontal low-pass filtering on the directional interpolation input pixels in the central 2×2 or 4×4 pixel range in the sampling window. When the interpolation angles 162 correspond to the angular intervals 350-360, the directional interpolation unit 130 performs vertical low-pass filtering on the directional interpolation input pixels in the central 2×2 pixel range of the sampling window.

Specifically, after the directional interpolation unit 130 selectively performs low-pass filtering on the directional interpolation input pixels according to the angular intervals associated with the interpolation angles 162, the directional interpolation unit 130 performs a convolution operation on the processed directional interpolation input pixels and a sampling window including coefficients. That is, each pixel in the 4×4 sampling window is associated with a coefficient. The weighted sum of the pixel values of the directional interpolation input pixels is obtained by using the coefficients associated with the sampling window as the weighting and, thus, the pixel value of the first pixel is generated. For example, the coefficients of the sampling window may be set according to the Lanczos interpolation algorithm or spline interpolation algorithm.

Figure 3B:
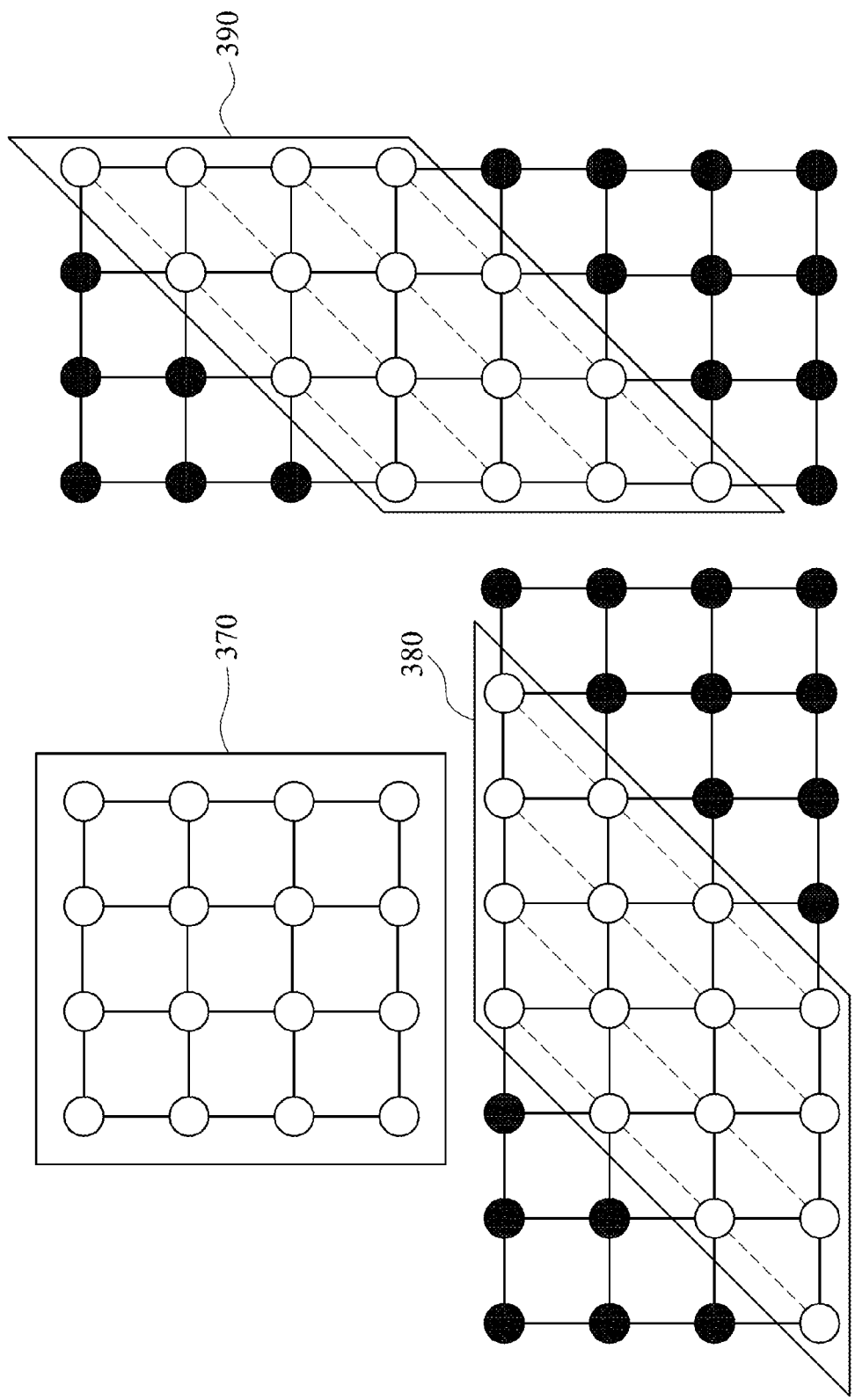

In another embodiment, the directional interpolation unit 130 also selects a sampling window from different angular sampling windows according to the angular interval 320. As shown in FIG. 3B, the angular sampling window includes a rectangular coordinate sampling window 370, a horizontal diagonal coordinate sampling window 380 and a vertical diagonal coordinate sampling window 390. The angular intervals 310 and 360 are associated with the rectangular coordinate sampling window 370, the angular intervals 320 and 330 are associated with the horizontal diagonal coordinate sampling window 380, and the angular intervals 340 and 350 are associated with the vertical diagonal coordinate sampling window 390. The directional interpolation unit 130 selects input pixels for generating the pixels value of the first pixel in the input image 160 according to the interpolation angles 162. Hence, because the input pixels are selected along the edge directions, the directional interpolation unit 130 prevents the generated image 163 from having blurred edges, thereby improving the sharpness of the image.

It is noted that, the angular intervals 310-360 are illustrated, and the angular intervals 310A-360A are supplementary angles of the angular intervals 310-360.

In another embodiment, the directional interpolation unit 130 also associates the interpolation angle 300 with the second angular interval, and blends the pixel value of the first pixel and another pixel value of the first pixel generated according to the second angular interval, so as to update the pixel value of the first pixel. For example, when higher image smoothness is required, the directional interpolation unit 130 associates the interpolation angle 300 with the angular interval 320, and further selects the angular interval 310 second closer to the interpolation angle 300. Also, the directional interpolation unit 130 determines whether to perform low-pass filtering and the direction of low-pass filtering according to the angular interval 310, and further selects the directional interpolation input pixel by the angular sampling window associated with the angular interval 310, and calculates another pixel value of the first pixel according to pixel value of the selected directional interpolation input pixel. Subsequently, the directional interpolation unit 130 further blends the pixel value and another pixel value of the first pixel into a new pixel value of the first pixel according to the differences between interpolation angle 300 and the center angles of the angular intervals 310 and 320.

Because the directional interpolation unit 130 generates the pixel value of the first pixel according to two nearing angular intervals, if the input image 160 is one of continuous images (e.g., film), the edge portion with a continuous change of angle can be prevented from jittering when the image processing apparatus 100 displays the output image 165 continuously.

In some embodiments, a new pixel value of the first pixel is a weighted sum of the pixel value and another pixel value of the first pixel according to the differences between the interpolation angle 300 and the center angles of the angular intervals 310-320. The weighting factors of the pixel value and another pixel value are inversely proportional to the differences between the interpolation angle 300 and the center angles of the angular intervals 310-320 respectively. For example, the differences between the center angles of the angular intervals 310, 320 and the interpolation angle 300 are 9° and 6°, respectively. Therefore, the weighting factors of the pixel value and another pixel value are 0.4 and 0.6, respectively, and the directional interpolation unit 130 calculates the weighted sum of the pixel value and another pixel value.

The blender unit 150 receives the image 163 and the image 164. The resolution of the image 164 is the same as that of the image 163. The directional confidence values 161 generated by the direction determining unit 120 are associated with weighting factors of the images 163 and 164, and the blender unit 150 blends the image 163 and the image 164 into the output image 165 according to the weighting factors. For example, the blender unit 150 uses the directional confidence values 161 as the weighting factor α of the image 163. Moreover, the weighting factor of the image 164 is (1-α). Finally, the blender unit 150 calculates the weighted sum of the image 163 and the image 164 as the output image 165.

The image interpolation unit 140 performs conventional image interpolation (e.g., nondirectional bilinear interpolation technology, Bicubic interpolation technology or other nonlinear image interpolation technologies) on the input image 160.

In one embodiment, the image processing apparatus 100 includes the gradient calculation unit 110, the direction determining unit 120 and the directional interpolation unit 130, and the functions of the components are described above. In the embodiment, the directional interpolation unit 130 receives the interpolation angles 162 outputted by the direction determining unit 120, and performs low-pass filtering on the interpolation angles 162, such that the direction of performing directional interpolation is closer to the interpolation angle 162 (i.e., edge direction) for reducing artifact or blur phenomena that often occur at the edge portion of the output image 165.

The image processing apparatus and the corresponding method of the disclosure are implemented by hardware with a low cost, and approximate the edge direction of the input pixels from small scale to large scale to obtain the interpolation angles. In addition, the image processing apparatus performs directional interpolation according to the interpolation angles, and then blends the images obtained by directional interpolation process and the conventional image interpolation process according to the directional confidence values 161, such that it would be available to obtain a high quality image with low operational complexity. The image processing apparatus further combines the low-pass filtering process to obtain the pixel value of the directional interpolation input pixels that is close to the interpolation angles 162, and blends the pixel values obtained by the directional interpolation process according to various angular intervals, such that the processing result of a single image or continuous images exhibits a sharp and clear imaging effect.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An image processing apparatus, comprising:
   a gradient calculation unit configured to perform an operation on an input image to generate gradient magnitudes and gradient angles respectively associated with a plurality of input pixels of the input image;
   a direction determining unit configured to generate a plurality of interpolation angles and a plurality of directional confidence values according to the gradient magnitudes and the gradient angles associated with the input pixels;
   a directional interpolation unit configured to perform directional interpolation on the input image according to the interpolation angles, so as to generate a first image with an image resolution different from that of the input image; and
   a blender unit configured to receive the first image and a second image generated from interpolating the input image, and configured to blend the first image and the second image into an output image according to weights of the first image and the second image associated with the directional confidence values, wherein the resolution of the second image is the same as that of the first image.

2. The image processing apparatus of claim 1, wherein the input pixels comprise a plurality of first input pixels in a first range, and the directional interpolation unit is configured to compare the gradient magnitudes and the gradient angles of the first input pixels and other input pixels adjacent to the first input pixels to generate a first interpolation angle of the interpolation angles and one of the directional confidence values.

3. The image processing apparatus of claim 2, wherein the input pixels comprise a plurality of second input pixels in a second range, and the second range comprises the first range, and the directional interpolation unit is configured to compare the first interpolation angle and the gradient angles of the second input pixels to update the first interpolation angle.

4. The image processing apparatus of claim 1, wherein the directional interpolation unit is configured to associate a first interpolation angle of the interpolation angles with a first angular interval of a plurality of angular intervals and select the input pixels within a sampling window as a plurality of directional interpolation input pixels, and to selectively perform low-pass filtering on the directional interpolation input pixels according to the first angular interval, and then to generate a pixel value of a first pixel according to pixel values of the processed directional interpolation input pixels, wherein the first pixel is associated with the first interpolation angle and is one of the pixels in the first image.

5. The image processing apparatus of claim 4, wherein the directional interpolation unit is configured to select one of a plurality of angular sampling windows as the sampling window according to the first angular interval, wherein the angular sampling windows comprise rectangular coordinate sampling windows, vertical diagonal coordinate sampling windows and horizontal diagonal coordinate sampling windows.

6. The image processing apparatus of claim 4, wherein the directional interpolation unit is configured to associate the first interpolation angle with a second angular interval, and to generate another pixel value of the first pixel according to the second angular interval, and to blend the pixel value and the another pixel value of the first pixel to update the pixel value of the first pixel.

7. An image processing method, comprising:
    performing an operation on an input image to generate gradient magnitudes and gradient angles associated with a plurality of input pixels of the input image;
    generating a plurality of interpolation angles and a plurality of directional confidence values according to the gradient magnitudes and the gradient angles associated with the input pixels;
    performing directional interpolation on the input image according to the interpolation angles, so as to generate a first image with an image resolution different from that of the input image; and
    performing interpolation on the input image to generate a second image, and blending the first image and the second image into an output image according to weights of the first image and the second image associated with the directional confidence values, wherein the resolution of the second image is the same as that of the first image.

8. The image processing method of claim 7, wherein the step of generating the interpolation angles and the directional confidence values comprises:
    comparing the gradient magnitudes and the gradient angles of a plurality of first input pixels and other input pixels adjacent to the first input pixels to generate a first interpolation angle of the interpolation angles and one of the directional confidence values, wherein the first input pixels comprise the input pixels located in the first range.

9. An image processing apparatus, comprising:
    a gradient calculation unit configured to perform an operation on an input image to generate gradient magnitudes and gradient angles associated with a plurality of input pixels of the input image;
    a direction determining unit configured to generate a plurality of interpolation angles according to the gradient magnitudes and the gradient angles associated with the input pixels; and
    a directional interpolation unit configured to associate a first interpolation angle of the interpolation angles with a first angular interval of a plurality of angular intervals and select the input pixels within a sampling window as a plurality of directional interpolation input pixels, and to selectively perform low-pass filtering on the directional interpolation input pixels according to the first angular interval, and then to generate a pixel value of a first pixel according to pixel values of the processed directional interpolation input pixels, wherein the first pixel is associated with the first interpolation angle and is one of the pixels in the first image.

10. The image processing apparatus of claim 9, wherein the directional interpolation unit is configured to select one of a plurality of angular sampling windows as the sampling window according to the first angular interval, wherein the angular sampling windows comprise rectangular coordinate sampling windows, vertical diagonal coordinate sampling windows and horizontal diagonal coordinate sampling windows.

11. The image processing apparatus of claim 9, wherein the directional interpolation unit is configured to associate the first interpolation angle with a second angular interval, and to generate another pixel value of the first pixel according to the second angular interval, and to blend the pixel value and the another pixel value of the first pixel, so as to update the pixel value of the first pixel.

* * * * *